US012512610B2

(12) United States Patent
Pförtner et al.

(10) Patent No.: US 12,512,610 B2
(45) Date of Patent: Dec. 30, 2025

(54) ELECTRONIC DEVICE AND CONTACT ELEMENT FOR USE IN AN ELECTRONIC DEVICE

(71) Applicant: PHOENIX CONTACT GmbH & Co. KG, Blomberg (DE)

(72) Inventors: Steffen Pförtner, Springe (DE); Peter Berg, Schlangen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 313 days.

(21) Appl. No.: 18/482,485

(22) Filed: Oct. 6, 2023

(65) Prior Publication Data

US 2024/0120669 A1 Apr. 11, 2024

(30) Foreign Application Priority Data

Oct. 10, 2022 (BE) .................................. 2022/5812

(51) Int. Cl.

*H01R 4/00* (2006.01)
*H01R 4/48* (2006.01)
*H01R 9/26* (2006.01)

(52) U.S. Cl.

CPC ............. *H01R 9/2608* (2013.01); *H01R 4/48* (2013.01); *H01R 9/2641* (2013.01)

(58) Field of Classification Search

CPC ....... H01R 4/48; H01R 9/2608; H01R 9/2841
See application file for complete search history.

(56) References Cited

U.S. PATENT DOCUMENTS 3,668,344 A * 6/1972 Lehmann ................. H01R 4/50 439/409
5,685,735 A * 11/1997 Hohorst ............... H01R 4/4833 439/441
5,759,071 A * 6/1998 Hanning ............. H01R 9/2675 439/716
6,270,383 B1 * 8/2001 Wielsch ............... H01R 4/4852 439/828
6,682,364 B2 * 1/2004 Cisey ................... H01R 9/2666 439/441

(Continued)

FOREIGN PATENT DOCUMENTS

DE 102009008386 A1 8/2010

*Primary Examiner* — Phuong Chi Thi Nguyen
(74) *Attorney, Agent, or Firm* — Calderon Safran & Wright P.C.; David S. Safran

(57) ABSTRACT

An electronic device for mounting on a support rail, has a housing, an electronic unit arranged in the housing, and an elastic contact element that serves in the electrically-conductive connection between the electronic unit and the support rail. The contact element has two contact legs, a connecting area connecting the contact legs to one another, and a contacting section connected to the connecting area for making contact with the electronic unit, and wherein when the electronic device is in the mounted state, the contact legs of the contact element make contact in a clamping manner with a leg of the support rail in-between. The contact element arranged ensures, with small size, good electrical and mechanical contacting of the support rail. The sides of the two contact legs facing one another form a short contact area. The first contact area on is sharp-edged, and the second contact area forms a swivel.

17 Claims, 5 Drawing Sheets

(56) References Cited

U.S. PATENT DOCUMENTS

| | | | | |
|---|---|---|---|---|
| 6,773,313 | B2 * | 8/2004 | Pedrinelli ............ | H01R 4/4816<br>439/828 |
| 6,786,779 | B2 * | 9/2004 | Feldmeier ............ | H01R 13/506<br>439/828 |
| 9,373,899 | B2 * | 6/2016 | Wu .......................... | H01R 4/48 |
| 9,442,890 | B2 * | 9/2016 | Matsuo ................. | G06F 9/5027 |
| 9,502,790 | B2 * | 11/2016 | Kollmann ............ | H01R 4/4821 |

* cited by examiner

ELECTRONIC DEVICE AND CONTACT ELEMENT FOR USE IN AN ELECTRONIC DEVICE

BACKGROUND OF THE INVENTION

Field of the Invention

The invention relates to an electronic device, in particular an overvoltage protector, to be mounted on a support rail, with a housing, with an electronic unit arranged in the housing, and with a resilient contact element that serves in the electrically-conductive connection between the electronic unit and the support rail. The contact element has two contact legs, a connecting area connecting the contact legs to one another, and a contacting section for contacting the electronic unit, wherein when the electronic device is in the mounted state, the contact legs of the contact element make contact in a clamping manner with a leg of the support rail in-between. In addition, the invention also relates to a contact element for use in an electronic device that has a housing and an electronic unit.

Description of Related Art

Electronic devices to be mounted on a support rail, in particular a so-called cap rail with two legs, have been known for many years and are used in various embodiments and for various applications. Similar to electrical series terminals, which are in general also snapped onto support rails, these electronic devices have at least two conductor terminal elements, via which electrical conductors can be connected to the electronic unit arranged in the housing. As conductor terminal elements, various types of terminals can be used, for example screw terminals, spring-action terminals, or tension-spring terminals.

In contrast to standard electrical series terminals, which are designed as circuit terminals, the electronic devices in question additionally have an electronic unit, in which there can be in particular a conductor plate with electronic components arranged thereon. Depending upon the configuration of the electronic unit arranged inside the housing, the electronic devices can be used for various applications, in particular in the process, measuring, and control technology (process, measuring, and control applications). Thus, electronic devices can be designed as, for example, relay-interfaces, modular analog converters, or as overvoltage protectors.

If the electronic device is designed as an overvoltage protector, it has at least one overvoltage arrester, by which another device, for example a control unit, connected to the line terminal elements of the electronic device, can be protected from overvoltage. Such electronic devices for process, measuring, and control applications, designed as overvoltage protectors, have been known on the market for many years now.

A corresponding electronic device is known from DE 10 2009 008 386 B4. To achieve an electrically conductive connection between the electronic unit and the support rail, a contact element that has two springy metal contact links arranged parallel to one another, which links are connected to one another via an arm, is arranged in the foot area of the housing. In addition, a connecting element is arranged on the arm with multiple soldering pins, which can be plugged into corresponding boreholes in the conductor plate and can be soldered with contact surfaces on the conductor plate. The two contact links arranged one behind the other in the longitudinal direction of the support rail each two contact legs that are opposite one another and a connecting area connecting the contact legs to one another, wherein when the electronic device is in the mounted state, the contact legs of the contact links make contact in a clamping manner with a leg of the support rail in-between.

Since the known contact element has two contact links that are arranged parallel to one another, a secure and good electrical connection between the electronic unit and the support rail is ensured by the contact element. On the other side, however, the contact links that are arranged parallel to one another cannot drop below a specific minimum width of the electronic device.

SUMMARY OF THE INVENTION

The object of this invention is to make available an electronic device or a contact element for use in an electronic device, by which even in the case of a small available installation space, good and reliable electrical and mechanical contact of a support rail can be achieved.

This object is achieved in the case of the electronic device by, in each case, a contact area being formed on the sides of the two contact legs that face one another. Since, when the electronic device is in the mounted state, the two contact legs of the contact element make contact in a clamping manner with the legs of the support rail between them, the contact element has an upper contact leg and a lower contact leg relative to the legs of the support rail. In this case, the contact leg, which makes contact with the side of the leg of the support rail that faces the electronic device, is referred to as the upper contact leg. Correspondingly, the contact leg of the contact element that contacts the side of the leg of the support rail that faces away from the electronic device is referred to as the lower contact leg when the electronic device is snapped onto the support rail.

The first contact area, which is made on the upper contact leg, is sharp-edged. The second contact area, which is made on the lower contact leg, is arranged perpendicular to the longitudinal direction of the support rail offset to the first contact area, so that the first contact area and the second contact area do not face one another. The first contact area and the second contact area are thus located some distance apart along the horizontal central axis of the contact element. In addition, the two are contact areas. The leg of the support rail clamped between the contact legs of the contact element in the mounted state is thus not extensive but rather makes contact both on its top side and on its bottom side only in a limited contact area.

The housing of the electronic device is designed to be swung open on the support rail, wherein the electronic device is first pushed onto the one leg of the support rail with the contact element arranged in the foot area of the housing and then is snapped on via a rotational movement. In this case, the edge of the second leg of the support rail, which is not clamped by the contact element, is undercut by a sprung ratchet arm designed in the foot area of the housing, by which the electronic device or the housing is locked onto the support rail. By virtue of the rotational movement of the housing when snapped onto the support rail, the sharp-edged first contact area performs a relative movement on the facing top side of the leg of the support rail, thus ensuring that any impurity layers present are penetrated or eroded by the tip of the sharp-edged contact area, so that good electrical contact between the leg of the support rail and the contact leg is ensured. When snapping the electronic device onto the support rail, the second contact area on the lower contact leg in this case forms a swivel for the lower outer edge of the leg of the support rail.

It was previously stated that the two contact areas are made short. In this case, in particular in comparison to the respective contact legs, the two contact areas can be made short, so that they extend only over part of the area of the side of the respective contact leg facing one another. In other words, the contact legs can thus be made considerably longer than the respective contact areas.

In the case of a first advantageous configuration of the device according to the invention or the contact element according to the invention, in which the two contact legs in each case are made longer than the respective contact areas, the two contact legs are arranged at least partially opposite to one another. The lower contact leg is then designed in such a way that its side facing the leg of the support rail runs at an acute angle α to the leg of the support rail when the electronic device is in the mounted state. In other words, the side of the lower contact leg facing the upper contact leg runs at an acute angle α to the horizontal central axis of the contact element, wherein when the device is in the mounted state, the horizontal central axis of the contact element and the extension direction of the leg of the support rail coincide perpendicular to the longitudinal extension of the support rail.

The statement that the two contact legs are arranged at least partially opposite to one another means that the two contact legs can also be arranged somewhat offset relative to one another or can have different lengths. Since, in addition, the side of the lower contact leg facing the upper contact leg runs at an acute angle α to the horizontal central axis of the contact element, the two contact legs also must not be arranged parallel to one another, in any case not over their entire length.

According to a preferred further development, in the case of a contact element with two contact legs that are at least partially opposite to one another, the vertical distance a between the first contact area of the upper contact leg and the opposite area of the lower contact leg is greater than the thickness d of the leg of the support rail. This ensures that when the contact element is pushed onto the leg of the support rail, the tip of the sharp-edged first contact area is not pressed against the upper edge of the leg of the support rail when the side of the lower contact leg facing the upper contact leg slides along the bottom side of the leg of the support rail. The tip of the sharp-edged first contact area that serves to penetrate or erode any impurity layers on the top side of the leg of the support rail is thus not damaged by this tip abutting the upper edge of the leg of the support rail. This would namely then be the case when the vertical distance a between the first contact area of the upper contact leg and the opposite area of the lower contact leg would be smaller than the thickness d of the leg of the support rail, since then even when the contact element is pushed onto the leg of the support rail, the two contact legs would have to be pressed together by the legs of the support rail inserted in-between.

It was previously stated that the second contact area forms a swivel for the lower edge of the leg of the support rail. Such a swivel could be made, for example, in such a way that in the side of the lower contact leg facing the upper contact leg, a corresponding recess or depression is made, in which the lower outer edge of the leg of the support rail engages in the fixed position when the electronic device is pivoted.

Preferably, on the side of the lower contact leg facing the upper contact leg, however, a stop is formed, which together with the second contact area forms the swivel for the lower outer edge of the leg of the support rail. At the same time, a limitation is provided when the contact element or the electronic device is pushed onto the leg of the support rail by the presence of a stop on the second contact leg. If the electronic device is pivoted after the contact element is pushed onto the leg of the support rail, in this case a small relative movement also results between the second contact area and the lower edge of the leg of the support rail, so that impurity layers that may also be present in this area are removed from the surface of the support rail.

In a second configuration of the device according to the invention or the contact element according to the invention, the lower contact leg is made shorter, in particular considerably shorter, than the upper contact leg. The lower contact leg is in this case preferably made short so that it has essentially only the second contact area and the adjacent stop, which with the second contact area forms the swivel for the lower outer edge of the leg of a support rail. In the state mounted on the support rail, the lower contact leg then extends outward, preferably slightly or not at all, over the lower outer edge of the leg of the support rail in the direction of the center of the support rail. In this configuration, the contact element can thus be produced with especially low material expense.

When the second contact leg, as just described, has only a very small length, the two contact legs, namely when the electronic device is in the mounted state, can also make contact in a clamping manner with a leg of the support rail in-between; the second contact leg can then, however, no longer be used as an insertion surface when the device is pushed onto the support rail. According to an advantageous further development, it is therefore provided that in the foot area of the housing, adjacent to the lower contact leg, an insertion surface is formed, on which the leg of the support rail rests when the housing is mounted on the support rail. The function of an insertion surface, which with a lower contact leg of a sufficient length is assumed by the latter, is then taken over by the insertion surface formed in the foot area of the housing.

According to another advantageous configuration of the electronic device or the contact element, the horizontal distance 1 between the first contact area of the upper contact leg and the second contact area of the lower contact leg is greater than the thickness d of the leg of the support rail. A relatively large horizontal distance perpendicular to the longitudinal direction of the support rail between the two contact areas leads both to a greater relative movement of the first sharp-edged contact area when the electronic device is swung open onto the support rail and to a higher contact force of the two contact legs of the contact element on the leg of the support rail in the mounted state.

According to another preferred configuration, a receiving space for the contact element is made in the foot area of the housing facing the support rail. In the receiving space, in this case, guiding and holding arms are provided for the contacting section of the contact element, so that when the electronic device is snapped onto the support rail, forces engaging the contact element are primarily taken up by the housing and do not impact the connection between the contacting section of the contact element and the electronic unit.

In addition to the previously-described electronic device with a contact element for conductive connection between the electronic unit and a support rail, the invention also relates to a corresponding contact element for use in an electronic device. The contact element is in this case designed according to the invention.

As previously described in connection with the electronic device, in each case a contact area is made on the sides of the two contact legs facing one another, wherein the first contact area, which is made on the upper contact leg, is sharp-edged. The second contact area, which is made on the lower contact leg, is arranged offset to the first contact area along the horizontal central axis of the contact element and forms a swivel for the lower edge of the leg of the support rail.

If, in the case of the contact element, the two contact legs are in each case made considerably longer than the respective contact areas, the two contact legs are arranged at least partially opposite to one another. In this case, the side of the lower contact leg facing the upper contact leg runs at an acute angle α to the horizontal central axis M of the contact element.

This configuration of the two contact legs makes it possible to push the contact element first onto the leg of a support rail and then it can be pivoted around a small angle, wherein the possible angle of rotation corresponds to the angle α at which the side of the lower contact leg facing the upper contact leg runs to the horizontal central axis of the contact element or to the leg of the support rail. The angle α is in this case preferably less than 30°, in particular less than 20°.

According to an alternative configuration of the contact element according to the invention, the lower contact leg is made shorter than the upper contact leg. The lower contact leg is in this case preferably made short, so that it has essentially only the second contact area and the adjacent stop, which with the second contact area forms the swivel for the lower outer edge of the leg of a support rail. The lower contact leg then has no area opposite to the first contact area.

The contact element according to the invention can be produced especially simply and thus economically, in such a way that the contact element preferably is designed as a one-piece stamped part or as a one-piece stamped and curved part. In this connection, the contacting section is preferably oriented essentially perpendicular to the horizontal central axis M of the contact element. The spring action of the contact element and thus the achievable contact force between the contact legs and the leg of the support rail can be established via the configuration of the preferably C-shaped connecting area between the two contact legs.

The contacting section is preferably designed as a contact pin or soldering pin or has laterally-projecting contact pins or soldering pins, so that the contacting section can be soldered to a corresponding connecting area of the electronic unit, in particular corresponding connecting surfaces on a conductor plate.

In particular, there are several options for configuring and further developing the The electronic device according to the invention or the contact element. To this end, reference is made both to the following description of a preferred embodiments in connection with the drawings.

BRIEF DESCRIPTION OF THE DRAWINGS

As electronic device 1, FIGS. 1 and 4 show an overvoltage protector to be mounted on a support rail 2, wherein the support rail 2 has two outward-pointing legs 3, 4. Electronic device 1 has a housing 5, in which an electronic unit is accommodated, which is made in this case from a conductor plate with electronic components arranged thereon. Multiple conductor terminal elements 7 are arranged on the two front sides of the housing 5, which elements are designed as spring-action clamps in the depicted embodiment.

FIG. 1 depicts the electronic device 1 when it is snapped onto the support rail 2, while in the view according to FIG. 4, the electronic device 1 is first pushed onto one leg 3 of the support rail 2 but is not snapped onto the support rail 2. To do so, the electronic device 1 must be pivoted counterclockwise from the position depicted in FIG. 4 until the housing 5 of the electronic device 1 locks with the second leg 4 of the support rail 2. To achieve an electrically conductive connection between the electronic unit 6 or a strip conductor arranged on the conductor plate and the support rail 2, a metal contact element 9 is arranged in the foot area 8 of the housing 5, which contact element is described more precisely below in particular in connection with FIGS. 2 and 3.

Figure 2A:
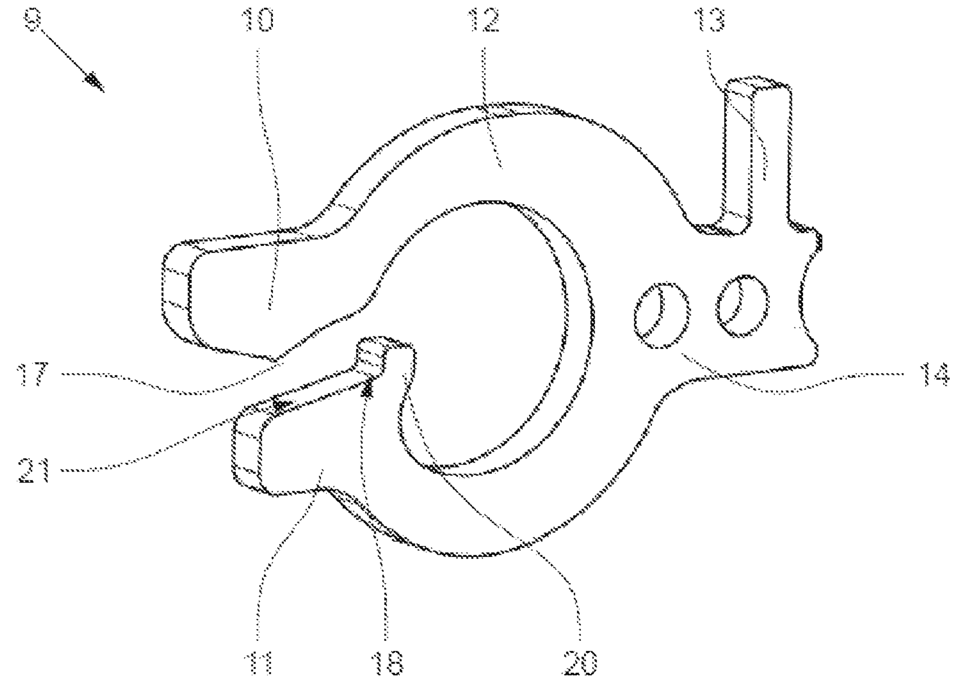
FIGS. 2*a* & 2*b* show a first embodiment of a contact element in a perspective view and from the side, respectively.
Figure 2B:
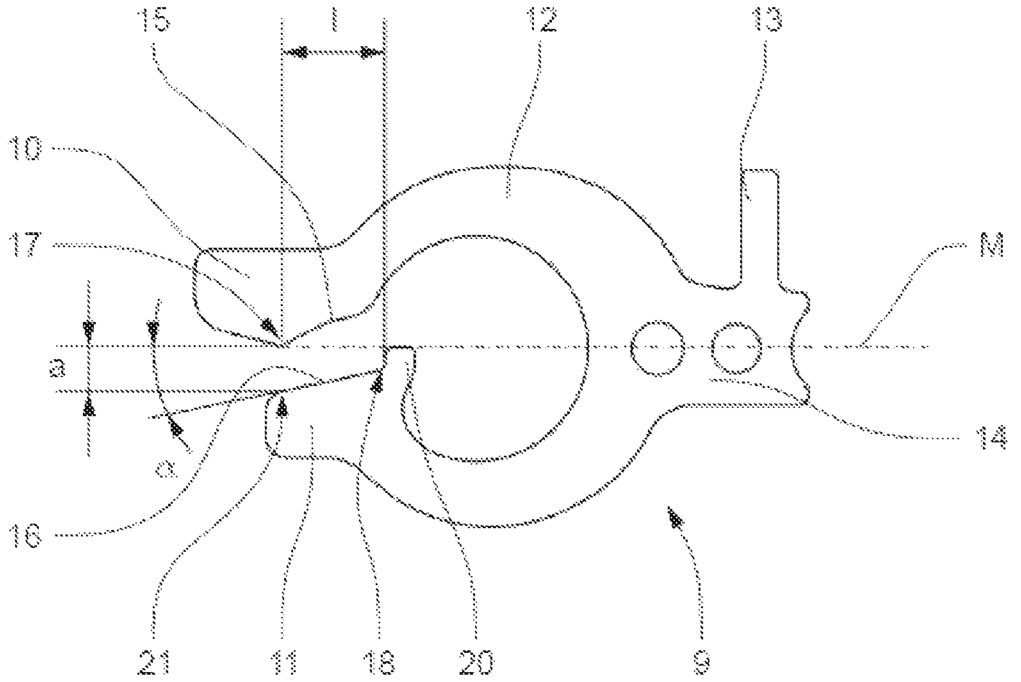

As can be seen from FIGS. 2*a* and 2*b*, the metal contact element 9 has two contact legs 10, 11 arranged at least partially opposite to one another, a connecting area 12, and a contacting section 13 connecting the contact legs 10, 11 to one another, which contacting section serves to contact the electronic unit 6 and is integrally connected via an arm 14 to the connecting area 12. On the sides 15, 16 of the two contact legs 10, 11 facing one another, in each case a shorter contact area 17, 18 is made, which, with the electronic device 1 snapped onto the support rail 2, contacts the leg 3 of the support rail 2 on its top and bottom sides.

In particular, it can be seen from the side view according to FIG. 2*b* that the two contact legs 10, 11 are arranged somewhat offset relative to one another and also do not have specifically the same length, so that the two contact legs 10, 11 are not arranged exactly opposite to one another. Moreover, it is evident that the two contact legs 10, 11 are also not arranged parallel to one another, in any case not over their entire length, which occurs due simply to the fact that the first contact area 17, which is made on the upper contact leg 10, is made sharp-edged and thus has a tip 19. The tip serves to penetrate and erode impurity layers, for example an oxide layer, optionally present on the surface of the leg 3 of the support rail 2.

The second contact area 18, which is made on the lower contact leg 11, is arranged along the horizontal central axis M of the contact element 9 offset to the first contact area 17, as can be seen in particular from FIG. 2*b*. In addition, the second contact area 18 serves as a swivel for the lower outer edge 20 of the leg 3 of the support rail 2 when the electronic device 1 is snapped onto the support rail 2, as can be seen from FIGS. 3*a*, 3*b*, and 3*c*. For this purpose, a stop 21 is provided on the side 16 of the lower contact leg 11 facing the upper contact leg 10 in the transition to the connecting area 12.

Figure 3A:
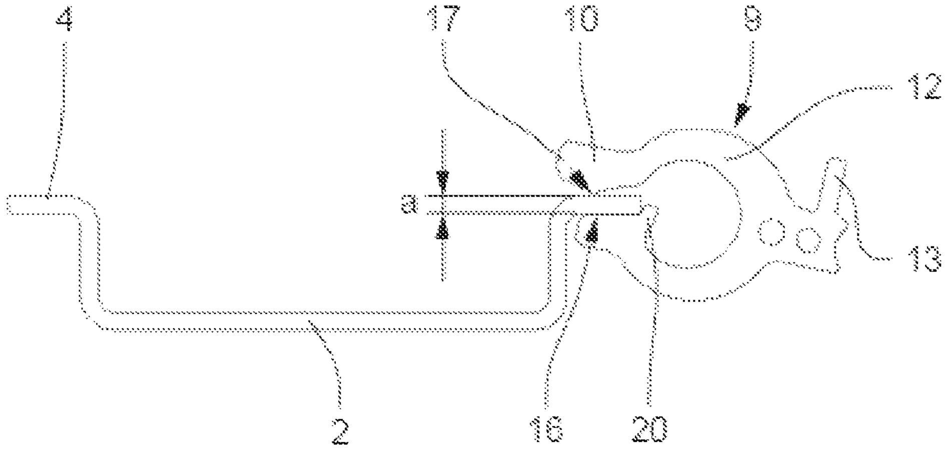
FIGS. 3*a*, 3*b*, and 3*c* show the contact element according to FIGS. 2*a* and 2*b*, in three different positions when snapped onto a support rail.
Figure 3C:
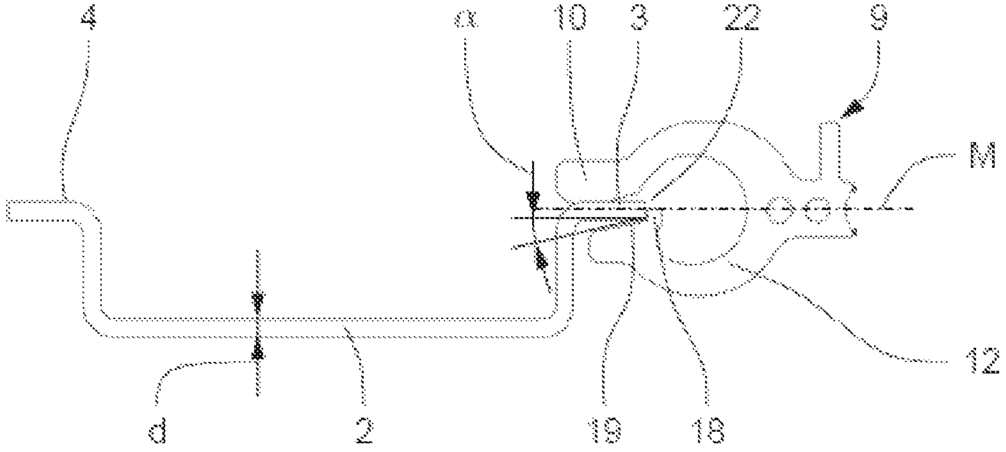
Figure 4:
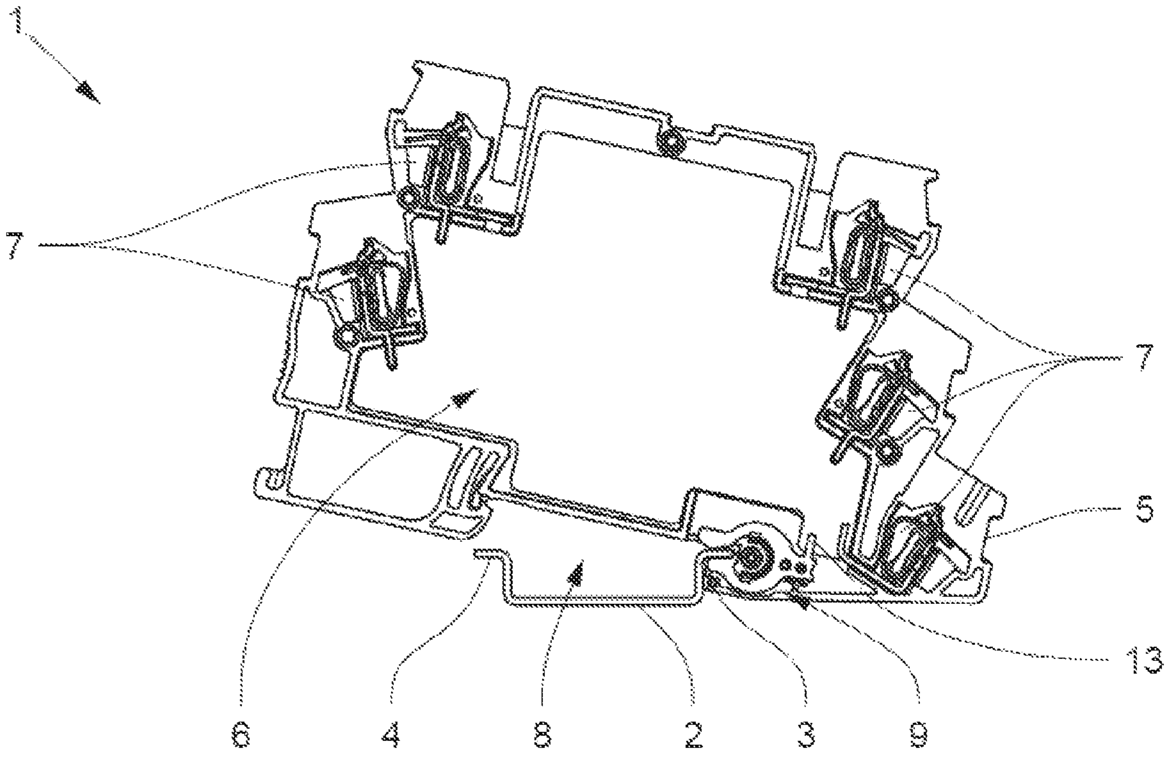
FIG. 4 shows the electronic device according to FIG. 1 before it is swung open onto the support rail.

FIG. 3*a* shows the position of the contact element 9 on the leg 3 of the support rail 2, when the electronic device 1 according to FIG. 4 is first pushed only with the contact element 9 onto the first leg 3 of the support rail 2. The side 16 of the second contact leg 11 facing the leg 3 or the first contact leg 10 in this case rests on the bottom side of the leg 3 of the support rail 2. As can be seen from FIG. 4, in this case, the electronic device 1 or the housing 5 is tilted counterclockwise around an angle α relative to its snapped-on position according to FIG. 1 or according to FIG. 3*c*. When the contact element 9 is pushed onto the leg 3 of the support rail 2, this tilting angle of the electronic device 1 corresponds to the acute angle α by which the side 16 of the lower contact leg 11 facing the upper contact leg 10 is oriented toward the horizontal central axis M of the contact element 9 (cf. FIG. 3*c*).

In addition, it is evident from FIG. 3*a* that the vertical distance a between the first contact area 17 or the tip 19 of the upper contact leg 10 and the opposite area 22 of the lower contact leg 11 is greater than the thickness d of the legs 3, 4 of the support rail 2. This ensures that the contact element 9 can first be easily pushed onto the leg 3 of the support rail 2 without the tip 19 of the sharp-edged first contact area 17 being pressed against the upper edge of the leg 3 of the support rail 2. As a result, damage to the tip 19 of the sharp-edged first contact area 17 is prevented, so that the sharp-edged first contact area 17, during subsequent pivoting of the electronic device 1, can optimally penetrate and erode impurity layers that are formed on the top side of the leg 3.

Figure 1:
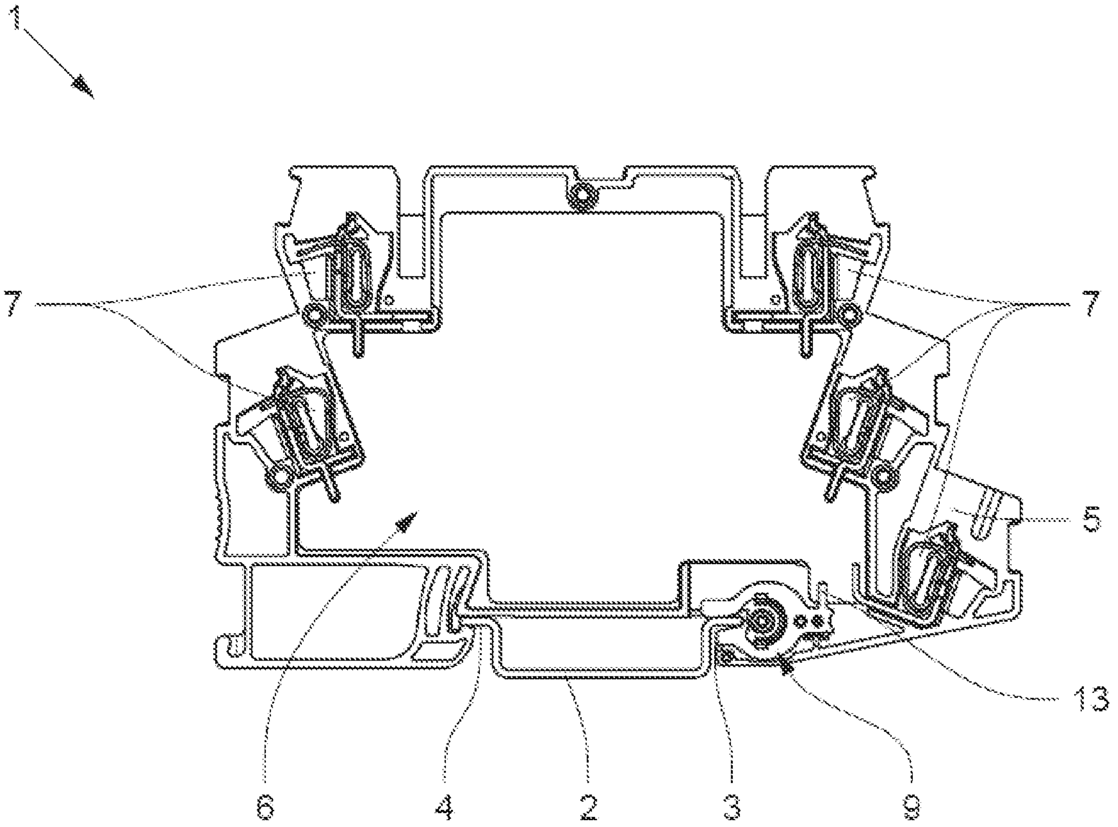
FIG. 1 shows an embodiment of an electronic device that is snapped onto a support rail.
Figure 3B:
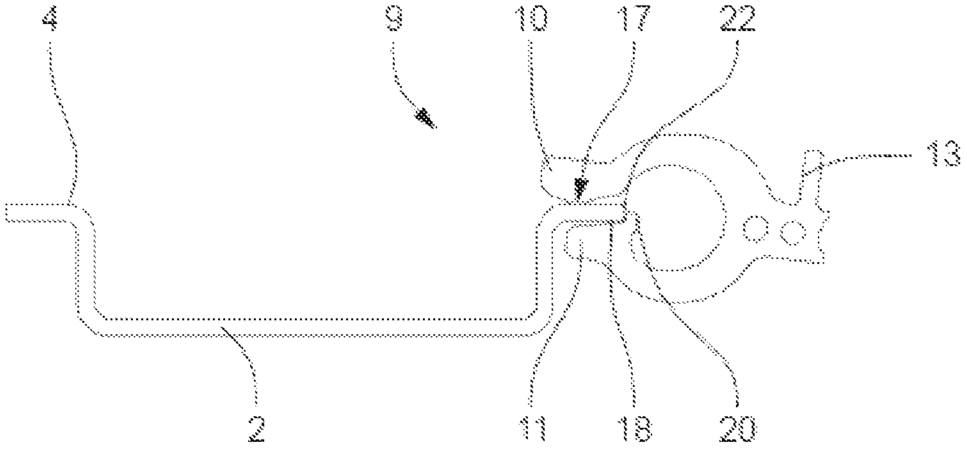

If the electronic device 1 pivots counterclockwise from the position depicted in FIG. 4 into the position depicted in FIG. 1, the contact element 9 is thus also pivoted counterclockwise, as can be seen from a comparison of FIGS. 3*a* and 3*c*. In this case, FIG. 3*b* shows an intermediate position when the contact element 9 has been pivoted around an angle smaller than the angle α. The pivoting of the contact element 9 results in the desired relative movement of the sharp-edged first contact area 17 relative to the leg 3 of the support rail 2 and thus in severing an impurity layer optionally present on the surface of the leg 3.

When pivoting the electronic device 1 or the contact element 9, the side 16 of the second contact leg 11 facing the first contact leg 10 lifts from the bottom side of the leg 3 of the support rail 2. In this case, the second contact area 18 acts on the lower contact leg 11 as a pivot point while the contact element 9 pivots. Since the vertical distance c between the first contact area 17 and the second contact area 18 is smaller than the vertical distance a between the first contact area 17 and the opposite area 21 of the second contact leg 11 and also smaller than the thickness d of the leg 3 of the support rail 2, the pivoting of the contact element 9 causes the two contact legs 10, 11 or the connecting area 12 to bend, so that the two contact areas 17, 18 are pressed against the top side or the bottom side of the leg 3 of the support rail 2. As a result, good electrical contact and also stable mechanical fixing of the contact element 9 on the leg 3 of the support rail 2 and thus also secure fixing of the electronic device 1 on the support rail 2 are ensured.

In the position of contact element 9 depicted in FIG. 3*c* or FIG. 4, the electronic device 1 is snapped onto the support rail 2. The horizontal central axis M of the contact element 9 then coincides with the extension of the leg 3 perpendicular to the longitudinal extension of the support rail 2. The angle α at which the side 16 of the lower contact leg 11 facing the upper contact leg 10 runs to the horizontal central axis M of the contact element 9 is preferably less than 20 degrees, in the case of the depicted embodiment, for example, 10 degrees. In addition, the horizontal distance 1 between the first contact area 17 and the second contact area 18 is greater than the thickness d of the leg 3 of the support rail 2.

Figure 5A:
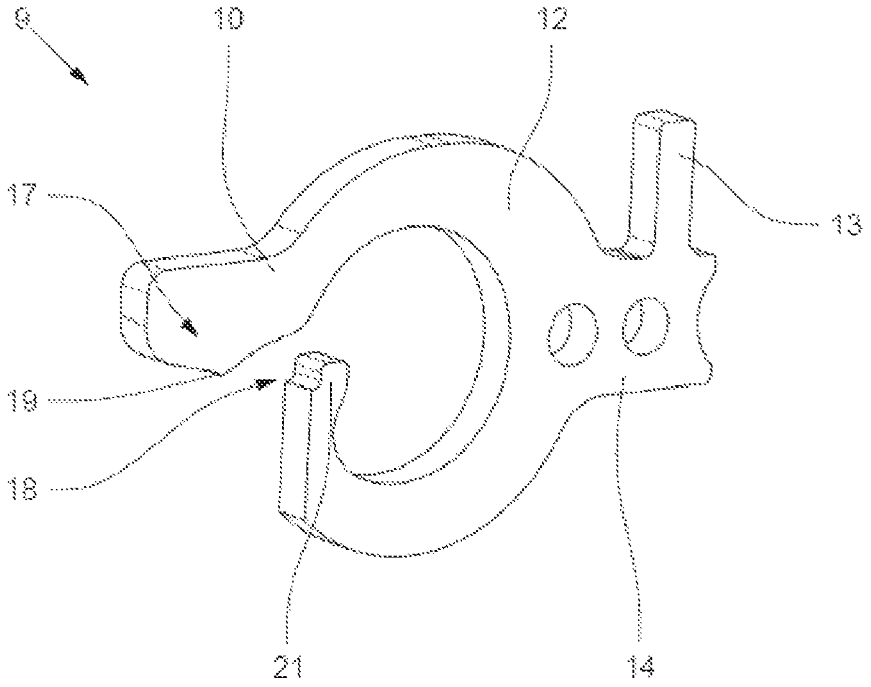
FIGS. 5*a* and 5*b* show a second embodiment of a contact element in a perspective view and from the side, respectively.
Figure 5B:
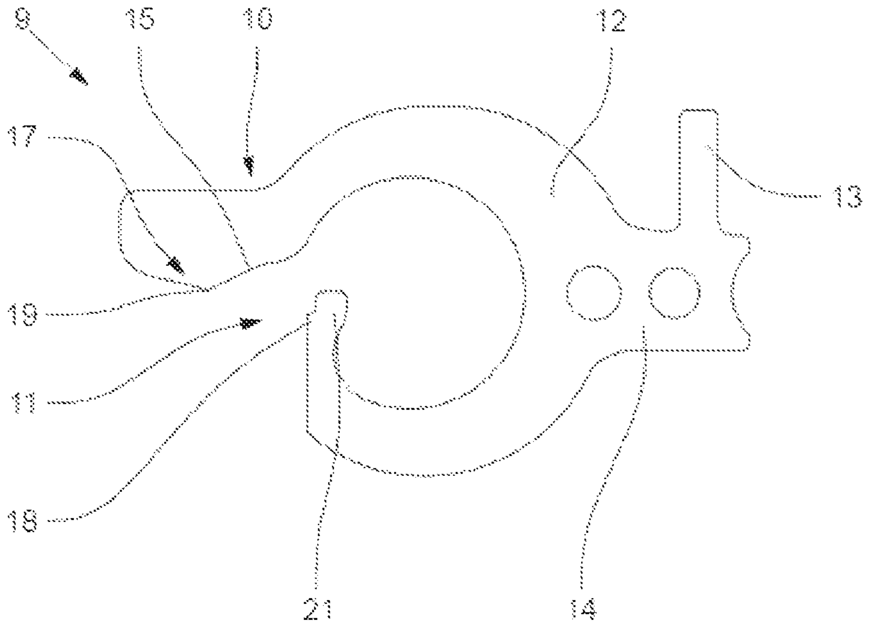

FIG. 5*a* and FIG. 5*b* show a second embodiment of a contact element 9 in perspective view (FIG. 5*a*) and from the side (FIG. 5*b*). In comparison to the first embodiment of the contact element 9 depicted in FIG. 2*a* and FIG. 2*b*, in the case of this contact element 9, the lower contact leg 11 is made considerably shorter than the upper contact leg 10. The lower contact element 9 also has no area opposite to the first contact area 17, but rather only the second contact area 18 and the adjacent stop 22, which with the second contact area 18 forms a swivel for the lower outer edge 20 of the leg 3 of a support rail 2.

Also, in the second embodiment of the contact element 9, the two contact legs 10, 11 are connected to one another via the connecting area 12, and the connecting area 12 is connected to a contacting section 13 via an arm 14, which contacting section serves to make contact with the electronic unit 6. On the sides 15, 16 of the two contact legs 10, 11 facing one another, in each case a shorter contact area 17, 18 is made, which contact area contacts the leg 3 of the support rail 2 on its top and bottom sides when the electronic device 1 is snapped onto the support rail 2. Also, in the case of this contact element 9, the first contact area 17 has a tip 19, so that the contact area 17 is made sharp-edged. The second contact area 18, which is made on the lower contact leg 11, is arranged along the horizontal central axis M of the contact element 9 offset to the first contact area 17 and serves together with the stop 21 as a swivel for the lower outer edge 20 of the leg 3 of the support rail 2 when the electronic device 1 is snapped onto the support rail 2.

As can be seen from the figures, the contact element 9 is made integral overall and can be produced from a flat metal part simply by punching out and optionally bending. The contact element 9 in this case preferably consists of a copper alloy, which is distinguished by high strength and good spring properties along with good conductivity.

REFERENCE SYMBOLS

1 Electronic device
2 Support rail
3, 4 Legs
5 Housing
6 Electronic unit
7 Conductor terminal element
8 Foot area
9 Contact element
10, 11 Contact legs
12 Connecting area
13 Contacting section
14 Arm
15, 16 Sides
17 First contact area
18 Second contact area
19 Tip
20 Lower outer edge of the leg
21 Stop
22 Opposite area
α Acute angle
a Vertical distance
l Horizontal distance
d Thickness
M Horizontal central axis

What is claimed is:

1. An electronic device that is mountable on a support rail, comprising:

a housing, an electronic unit arranged in the housing, and a resilient contact element that forms an electrically-conductive connection between the electronic unit and a support rail when in a mounted state on the support rail, wherein the contact element has two contact legs, a connecting area connecting the contact legs to one another, and a contacting section connected to the connecting area for contacting the electronic unit, and wherein when the electronic device is in the mounted state, sides of the contact legs of the contact element make contact in a clamping manner with a leg of the support rail located between them, wherein, in each case, a contact area is formed on the sides of the two contact legs facing one another, wherein a first contact area, which is made on an upper one of the contact legs, is sharp-edged, wherein a second contact area, which is made on a lower one of the contact legs, is arranged perpendicular to a longitudinal direction of the support rail offset to the first contact area, and wherein the second contact area forms a swivel for a lower outer edge of the leg of the support rail.

2. The electronic device according to claim 1, wherein a horizontal distance 1 perpendicular to the longitudinal direction of the support rail between the first contact area of the upper contact leg and the second contact area of the lower contact leg is greater than a thickness d of the leg of the support rail.

3. The electronic device according to claim 1, wherein a stop is formed on the side of the lower contact leg facing the upper contact leg, which stop together with the second contact area forms the swivel for the lower outer edge of the leg of the support rail.

4. The electronic device according to claim 3, wherein the lower contact leg is made shorter than the upper contact leg, wherein in the state mounted on the support rail, the lower contact leg extends outward, preferably slightly or not at all, over the lower outer edge of the leg of the support rail in the direction of the center of the support rail.

5. The electronic device according to claim 4, wherein in a foot area of the housing, adjacent to the lower contact leg, an insertion surface is formed, on which surface the leg of the support rail rests when the housing is mounted on the support rail.

6. The electronic device according to claim 1, wherein the two contact legs are arranged at least partially opposite to one another, and in wherein the side of the lower contact leg facing the upper contact leg runs at an acute angle $\alpha$ to the leg of the support rail when the electronic device is in the mounted state.

7. The electronic device according to claim 6, wherein the angle $\alpha$ between the lower contact leg and the leg of the support rail is less than 30° when the electronic device is in the mounted state.

8. The electronic device according to claim 6, wherein a vertical distance a between the first contact area of the upper contact leg and the opposite area of the lower contact leg is greater than a thickness d of the leg of the support rail.

9. A contact element for use in an electronic device having a housing and an electronic unit, and a resilient contact element with two contact legs, a connecting area connecting the contact legs to one another, and a contacting section connected to the connecting area for making contact with the electronic unit, wherein, in each case, a contact area is made on sides of the two contact legs facing one another, wherein a first contact area, which is on the upper contact leg, is sharp-edged, wherein a second contact area, which is made on the lower contact leg, is arranged along a horizontal central axis M of the contact element offset relative to the first contact area and forms a swivel for the lower outer edge of the leg of the support rail.

10. The contact element according to claim 9, wherein the contacting section is pin-shaped and runs essentially perpendicular to the horizontal central axis M of the contact element.

11. The contact element according to claim 9, wherein the connecting area is C-shaped.

12. The contact element according claim 9, wherein the contact element is a one-piece stamped part or a one-piece stamped and curved part.

13. The contact element according to claim 9, wherein the two contact legs are at least partially opposite to one another and wherein the side of the lower contact leg facing the upper contact leg runs at an acute angle $\alpha$ to the horizontal central axis M of the contact element.

14. The contact element according to claim 13, wherein the angle $\alpha$ between the lower contact leg and the horizontal central axis M of the contact element is less than 30°.

15. The contact element according to claim 9, wherein a stop is formed on the side of the lower contact leg facing the upper contact leg.

16. The contact element according to claim 15, wherein the lower contact leg is made shorter than the upper contact leg.

17. The contact element according to claim 16, wherein the lower contact leg has only the second contact area and the adjacent stop, the stop together with the second contact area forming a swivel for the lower outer edge of the leg of a support rail.

* * * * *